United States Patent [19]

Sweeny

[11] 4,005,011
[45] Jan. 25, 1977

[54] METHOD FOR TREATING EFFLUENT RESULTING FROM THE MANUFACTURE OF SYNTHETIC DYESTUFFS AND RELATED INTERMEDIATE CHEMICALS

[75] Inventor: Charles D. Sweeny, Loganton, Pa.

[73] Assignee: American Color & Chemical Corporation, Lock Haven, Pa.

[22] Filed: July 24, 1975

[21] Appl. No.: 598,687

Related U.S. Application Data

[63] Continuation-in-part of Ser. No. 396,694, Sept. 13, 1973, abandoned.

[52] U.S. Cl. .................................................. 210/18
[51] Int. Cl.$^2$ ........................................... C02C 5/02
[58] Field of Search ............... 210/2, 17, 18, 39, 40, 210/42 R, 52–54, 30 R

[56] References Cited

UNITED STATES PATENTS

| 1,747,175 | 2/1930 | Mahler | 210/39 |
| 2,445,323 | 7/1948 | Galatioto | 210/40 |
| 3,573,202 | 3/1971 | Sobota et al. | 210/18 |
| 3,803,033 | 4/1974 | Sutherland | 210/40 |
| 3,846,293 | 11/1974 | Campbell | 210/18 |

OTHER PUBLICATIONS

Gurnham, Industrial Wastewater Control, Academic Press, New York, (1965), pp. 375–393.

Primary Examiner—Thomas G. Wyse
Attorney, Agent, or Firm—Armstrong, Nikaido & Wegner

[57] ABSTRACT

A method and apparatus for treating effluent resulting from the manufacture of synthetic dyestuffs and related intermediate chemicals is provided. The effluent is subjected to equalization, chemical treatment, clarification to remove solids, further equalization and carbon adsorption to remove the color and toxic materials, followed by a secondary biological treatment which includes treatment with activated sludge and secondary clarification. The spent carbon used in the carbon adsorption is recycled to produce fresh carbon which is reused in the carbon adsorption process.

3 Claims, 2 Drawing Figures

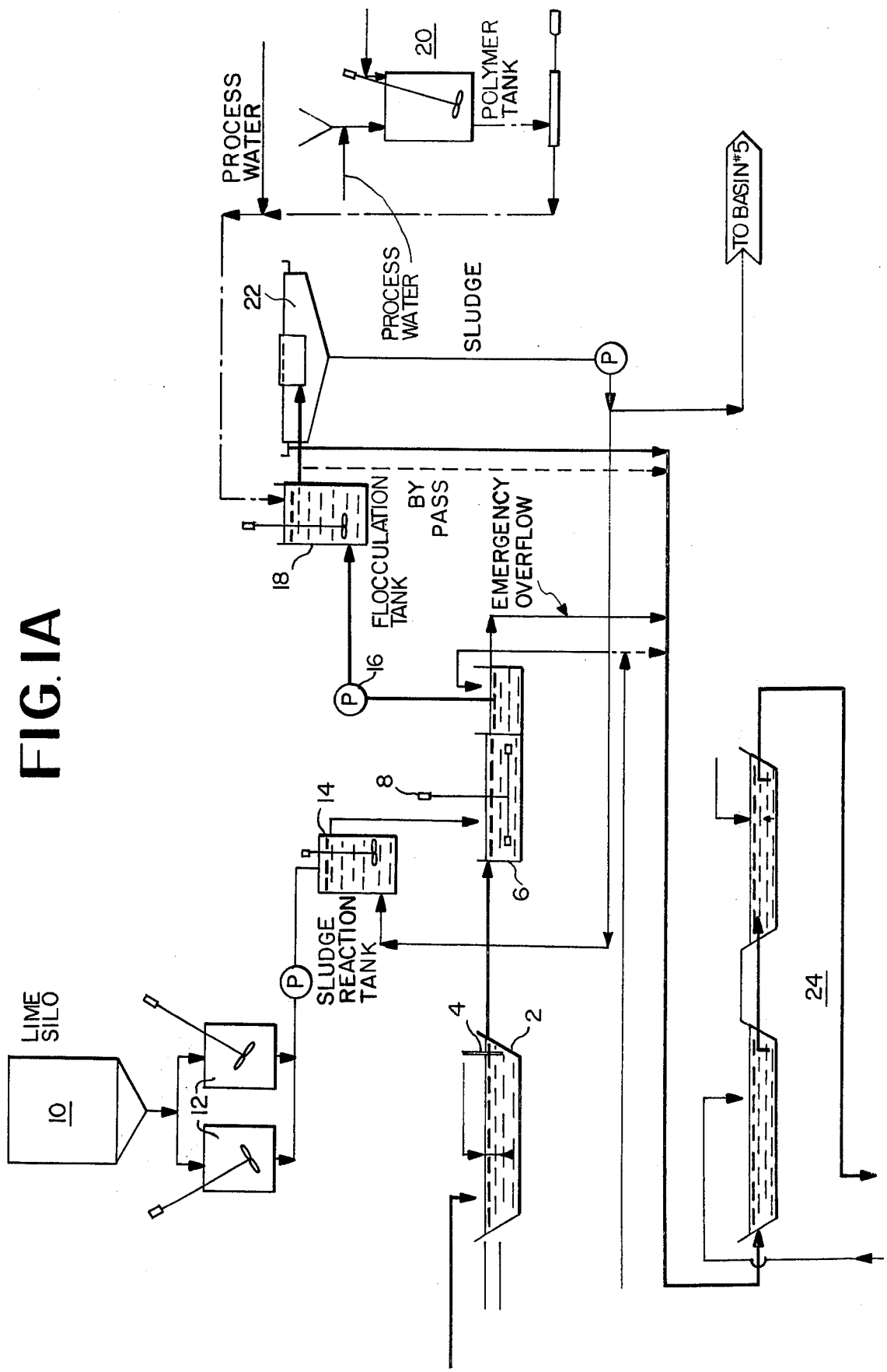

4,005,011

METHOD FOR TREATING EFFLUENT RESULTING FROM THE MANUFACTURE OF SYNTHETIC DYESTUFFS AND RELATED INTERMEDIATE CHEMICALS

BACKGROUND OF THE INVENTION

This application is a Continuation-in-Part of Application Ser. No. 396,694, filed Sept. 13, 1973, now abandoned.

Field of the Invention

This invention relates to a method for treating effluent resulting from the manufacture of synthetic dyestuffs and related intermediate chemicals, and in particular to a method and apparatus for reducing the color, TOC and BOD of the effluent to a predetermined level.

DESCRIPTION OF THE PRIOR ART

It has become an increasingly critical problem in contemporary society to provide close control over industrial processes, particularly in the chemical field, to take into account the ecological effects of such processes. This problem is particularly acute in the field of dyestuff manufacture, which produces a waste effluent containing toxic organic solvents and the by-products produced in the manufacture of chromophoric compounds. A great deal of attention has been focused on this problem in recent years. However, the problem of finding an effluent treatment system capable of efficiently removing the ecologically dangerous waste materials remains. Certain research efforts have been reported in the literature whose aim has been to reduce the ecological waste problems, such as Chambers et al, Developments in Industrial Microbiology, Vol. 5, p. 85 (1964); Erskine et al, Chemical Engineering Progress, Vol. 67, no. 11, p. 41 (1971); Ludzack et al, 1960 Journal WPCF 1173 and Marks, ed., Waste Water Treatment (N.Y.: Power 1967).

In spite of the high degree of research activity exemplified by the above efforts, it has heretofore not been found possible to provide an effluent treatment system with the necessary degree of efficiency to meet the evermore rigid environmental standards.

In organic chemical manufacturing, sources of aqueous effluent are the process itself, a wash used during the process and cooling water used during the process. The process water includes water used as the reaction medium or the water that is used for isolation of the product. This water is in intimate contact with the reactive end products and may contain in the dissolved or suspended state any of the chemicals used in the reaction as well as their reaction products. This water, the mother liquor, has a high organic load. After the reaction is completed, the product is isolated from the mother liquor by filtration. The residual pressed cake containing the impure product is water washed, leaving water-soluble impurities in the wash water. Cooling water is circulated around reaction vessels when the chemical reaction is exothermic. This cooling keeps the temperature within a desired range. Cooling water is also required on stills used for solvent recovery operations.

When an effluent results from the composite manufacture of synthetic dyestuffs and their related intermediate chemicals, the problem of effluent treatment is further complicated by the necessity of removing the color from the effluent. I have now discovered a unique multistage process particularly suited for dyestuff waste water treatment overcoming the drawbacks of the prior art.

Various biological treatments of organic compounds to reduce the BOD is known in the art. This technique includes the treatment of the effluent with activated sludge and thereafter the clarification of the treated effluent.

The removal of color from textile dye waste by the use of carbon adsorption is also known in the art. This is accomplished by passing the waste material through activated carbon adsorption columns which will reduce the color to a predetermined level.

The prior art, however, does not teach a system which uses a pre-treatment including a chemical treatment of dyestuff wastes to reduce toxicity and reduce the color to predetermined levels. Furthermore, the prior art does not teach a system which combines pre-treatment including the chemical and carbon treatment of the dyestuff wastes with passing the effluent through a secondary biological treatment.

SUMMARY OF THE INVENTION

It is an object of this invention to provide a method for the treatment of effluent from the manufacture of synthetic dyestuffs and related intermediate chemicals which reduces the color, TOC and BOD to predetermined levels.

The invention is directed to a method for treating effluent resulting from the manufacture of synthetic dyestuffs and relates intermediate chemicals which includes a multistage treatment process. The process includes equalization of the effluent followed by the chemical treatment of the effluent with a material such as lime to reduce levels of heavy metals. The chemically treated effluent is then subjected to clarification to remove the solids and then to further equalization. The further equalized effluent is then passed through carbon adsorption columns to reduce levels of nitrobenzene and the color of the effluent to a predetermined level. The thus treated effluent is then subjected to further treatment which contemplates biological treatment wherein the BOD is reduced using activated sludge; the treater effluent is thereafter subjected to further clarification, whereby the original aqueous effluent has been restored to a relatively pure and ecologically safe level, permitting discharge of the thus-purified water back into the ecological system.

In accordance with a preferred aspect of the invention, the spent carbon used in the carbon adsorption is recycled using a carbon regeneration furnace to produce fresh carbon which may then be used in the carbon adsorbers.

In this manner, the color, TOC and BOD of the effluent are reduced to predetermined acceptable levels prior to being discharged into the natural water supply.

BRIEF DESCRIPTION OF THE DRAWING

FIGS. 1A and 1B are a schematic diagram illustrating the method and apparatus of the present invention.

DESCRIPTION OF THE PREFERRED EMBODIMENT

Figure 1B:
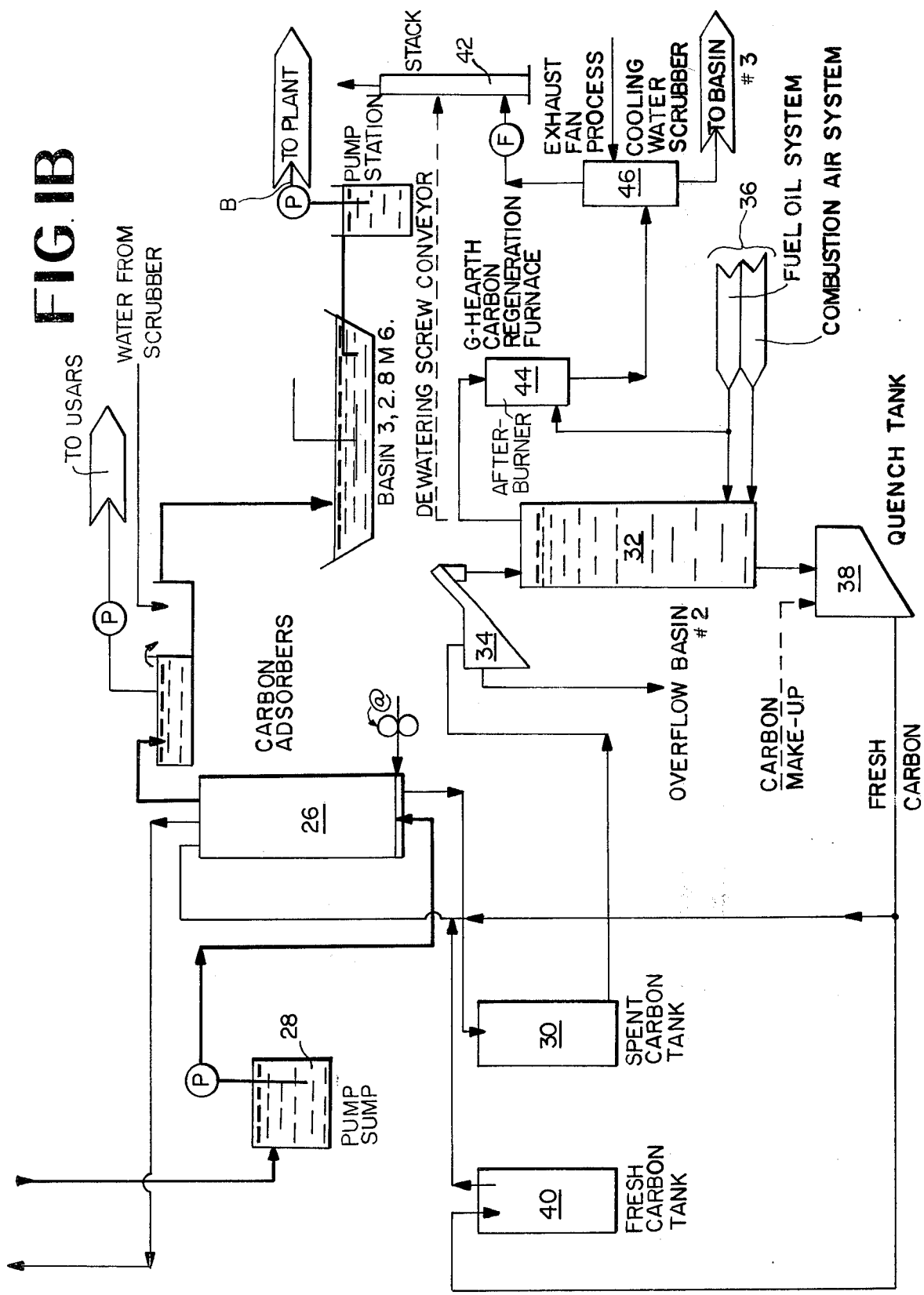

Referring to the figure, raw waste such as that set forth in Table 1 below, flows into basin 2.

TABLE 1

RAW WASTE CHARACTERISTICS

| | |
|---|---|
| Waste temperature | 40–150 |
| Color-APHA units | 5000 |
| pH | 1.2–12.0 |
| TOC | 700 Mg/l |
| Suspended Solids | 300 Mg/l |
| Dissolved Solids | 6000 Mg/l |
| Nitrogen, as ammonia | 122 Mg/l |
| Sulfates | 2500 Mg/l |
| Arsenic | 2 Mg/l |
| Chromium | 2 Mg/l |
| Copper | 20 Mg/l |
| Iron | 20 Mg/l |
| Lead | 1 Mg/l |
| Mercury | 1 Mg/l |
| Zinc | 30 Mg/l |

In basin 2, the effluent is subjected to equalization, to avoid sudden changes in the effluent make-up. The flow of effluent from basin 2 is controlled by adjustable weir 4 and flows into neutralization basin 6 where chemical treatment takes place to in part stabilize the pH of the effluent. In neutralization basin 6, the effluent is mixed with a lime solution using a flash mixer 8. Lime is stored in a silo 10 and is put into solution in mixers 12. The lime solution is then pumped to a sludge reaction tank 14 where the lime solution is mixed with sludge. The lime and sludge solution is then put into neutralization basin 6 to be mixed with the effluent from basin 2. The chemically treated effluent is pumped by pump 16 to flocculation tank 18. In tank 18, the chemically treated effluent is mixed with a polymer flocculating agent from polymer source 20. The effluent is then transferred to clarifier 22 to remove solid matter from the effluent and the clear effluent is taken from the top of the clarifier and transferred to basin 24. A portion of the sludge from clarifier 22 is a waste product while another portion is used to provide the sludge for sludge reaction tank 14. Within basin 24, the clarified effluent undergoes a further equalization process.

After the further equalization in basin 24, the effluent is transferred to carbon adsorbers 26 through pump sump 28. The carbon adsorber includes a plurality of activated carbon columns which are used to remove color and toxic materials.

After passing through the carbon adsorption means, the treated effluent is pumped to a biological treatment system which includes treatment with activated sludge, followed by clarification. The activated sludge contemplated according to the invention is based upon microorganisms capable of biodegrading the organic waste materials in the effluent, particularly aromatic compounds such as aromatic amines. Microorganisms which have been found suitable for such biodegradation include the Pseudomonas, Achromobacter, Xanthomonas and Flavobacterium series.

After this treatment, the effluent which is placed in a natural water supply contains the following elements:

TABLE 2

EFFLUENT REQUIREMENTS

| | |
|---|---|
| Temperature | 150° F max., not under 32° F min. |
| Color | 500 APHA Units |
| pH | 6.5 to 9.0 |
| Solids, Suspended | 150 Mg/l |
| Nitrobenzene | 10 Mg/l |
| Arsenic | .01 Mg/l |
| Mercury | .001 Mg/l |
| Chlorine Demand | 150 Mg/l |
| Phenolic Compounds: | |
| AS $C_6H_5$ OH | 1 Mg/l |
| Cyanides AS CN | 1 Mg/l |
| Cyanides AS CNO | 1 Mg/l |
| Iron AS Fe | 10 Mg/l |
| Chromium | 2 Mg/l |
| Nickel AS Ni | 1 Mg/l |
| Copper Cu | 2 Mg/l |
| Lead AS Pb | 1 Mg/l |
| Zinc AS Zn | 2 Mg/l |
| BOD | 20 Mg/l |

In order to improve the efficiency of the overall system, it is desirable to recover the spent carbon from the carbon adsorbers. Spent carbon is transferred to spent carbon tank 30. The carbon from tank 30 is then transferred to carbon regeneration furnace 32 by means of dewatering screw conveyor 34. Fuel supply 36 supplies the fuel necessary to incinerate the carbon in the carbon regeneration furnace. Fresh carbon from the furnace is transferred to a quench tank 38, and from there to fresh carbon tank 40. The carbon in fresh carbon tank 40 is transferred to the carbon adsorber 26 as it is needed. Additionally, the carbon may be transferred directly from quench tank 38 to the carbon adsorbers 26 without passing through fresh carbon tank 40. The exhausts from carbon regeneration furnace 36 are released from a stack 42 and are also transferred to after burner 44. The output of after burner 44 is cooled in process cooler 46 and then ejected through stack 42.

As previously indicated, it is imperative to the present invention that the required procedures be carried out in the proper sequence. Therefore, the chemical neutrilization must be carried our, prior to both the carbon adsorption and biological treatment steps and the carbon adsorption must preceed the biological treatment. The significance of this feature of the invention will be further appreciated by considering the following data:

Table 3 gives the composition of a typical effluent before treatment according to the present invention.

Table 3

| Item | Maximum | Average |
|---|---|---|
| Volume | 1.69 Million Gallons | 1.33 Million |
| Color | 8000 APHA Units | 6350 APHA |
| pH | 1.6 | 2.3 |
| TOC (includes nitrobenzene) | 585 PPM | 377 PPM |
| BOD | 540 | 364 |
| COD | 1648 | 1047 |
| Suspended Solids | 170 | 64 |
| Dissolved Solids | 4248 | 3022 |
| Mercury | 1.23 | 0.22 |
| Iron | 21.5 | 9.0 |
| Chromium | 1.9 | 0.9 |
| Nickel | 1.1 | 0.8 |
| Copper | 8.1 | 3.0 |
| Lead | 0.7 | 0.5 |
| Zinc | 61.0 | 24 |

The effluent of Table 3 was first chemically treated with lime in accordance with the practice of this invention to reduce the levels of heavy metals to below toxic levels since these heavy metals are toxic to microorganisms used during the subsequent biological treatment. Results of the lime treatment are shown in Table 4.

Table 4

| | AVERAGE LIME TREATMENT DISCHARGE | |
|---|---|---|
| Item | Maximum Concentration | Yearly Average Concentration |
| Volumn[1] | | 1.38 Million Gallons |
| Color[1] | 6780 APHA Units | 3350 APHA Units |
| pH[1] | | 8.5 |
| TOC[2] | | .178 PPM |
| BOD[1] | 1410 PPM | 419 |
| COD[1] | 2861 | 806 |
| Suspended Solids[1] | 470 | 54 |
| Dissolved Solids[1] | 4295 | 3873 |
| Mercury[2] | | 0.10 |
| Iron[2] | | 0.6 |
| Chromium[2] | | Less than 0.4 |
| Nickel[2] | | Less than 0.4 |
| Copper[2] | | Less than 0.02 |
| Lead[2] | | Less than 0.5 |
| Zinc[2] | | 0.2 |

[1]Yearly average
[2]Data from 10–48 hour composite samples

After the chemical lime treatment to reduce heavy metals, the effluent was treated in a carbon adsorbtion column to remove nitrobenzene. While very low levels of nitrobenzene increase the respiration rate of bacteria, above nitrobenzene concentrations of 12.0 mg/l the respiration rate begins to decline and falls to below 80% of the base rate at concentrations above 29.4 mg/l. Therefore, it is important that nitrobenzene levels be reduced in the effluent prior to the biological treatment. Table 6 compares nitrobenzene levels in the effluent entering the carbon adsorbtion columns with levels in the effluent exiting from the carbon adsorbtion columns.

Table 5

| NITROBENZENE LEVELS mg/l | | |
|---|---|---|
| Date of Test | In | Out |
| 6/14/70 | 8.0 | 3.0 |
| 6/15/70 | 9.0 | 3.5 |
| 6/17/70 | 17.0 | 5.0 |
| 6/18/70 | 6.0 | 3.5 |
| 6/19/70 | 36.5 | 5.0 |
| 6/20/70 | 23.5 | 1.5 |
| 6/21/70 | 13.5 | 7.5 |
| 6/22/70 | 8.0 | 4.0 |
| 6/23/70 | 7.5 | 4.0 |

It can be seen that carbon adsorbtion treatment reduces the nitrobenzene in the effluent to a level below that which is toxic to the microorganisms to be used in a subsequent biological treatment, when the levels are higher than the toxic level.

By way of comparison, typical daily measurement of column pressure as a function of time carbon adsorbtion columns having chemically untreated effluent of Table 3 applied thereto is shown below in Table 6. Table 6 shows that when chemically untreated effluent is processed in carbon adsorption columns, there is excessive pressure due to sludge buildup.

Table 6

| Time | Column No. | Pressure (psi) | Pressure After Backwash |
|---|---|---|---|
| 8:30 | 1 | 17 | |
| | 2 | 17 | |
| | 3 | 16 | |
| | 4 | 16 | |
| 10:00 | 1 | 30+ | 17 |
| | 2 | 30+ | 12 |
| | 3 | 30+ | 11 |
| | 4 | 30 | 11 |
| 11:50 | 1 | 20 | |
| | 2 | 9 | |
| | 3 | 8 | |
| | 4 | 8 | |
| 2:00 | 1 | 25 | 13 |
| | 2 | 26 | 13 |
| | 3 | 24 | 13 |
| | 4 | 23.5 | 13 |
| 2:30 | 1 | 24 | 14 |
| | 2 | 25 | 15 |
| | 3 | 23 | 13 |
| | 4 | 23 | 13 |
| 3:00 | 1 | 25 | 15 |
| | 2 | 25 | 15 |
| | 3 | 25 | 15 |
| | 4 | 25 | 15 |
| 3:45 | 1 | 25 | 15 |
| | 2 | 25 | 15 |
| | 3 | 25 | 15 |
| | 4 | 25 | 15 |
| 4:00 | 1 | 17 | |
| | 2 | 16 | |
| | 3 | 16 | |
| | 4 | 16 | SHUTDOWN |

The data above shows that when chemically untreated effluent is processed by carbon adsorbtion columns, there are significant pressure increases during relatively short periods of time, and to reduce pressure, it is necessary to frequently backwash the carbon adsorbtion columns. After backwashing, the pressure increases again upon further processing of effluent.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A method of treating an effluent which is an aqueous mixture containing environmentally significant amounts of organic solvents and byproducts of processes for the production of chromophoric compounds resulting from the manufacture of synthetic dyestuffs and related intermediate chemicals, said organic solvents and byproducts including toxic amounts of nitrobenzene and one or more heavy metals selected from the group consisting of mercury, iron, chromium, nickel, copper, lead, zinc, and arsenic, said process comprising:
   a. subjecting said effluent to a first equalizing treatment;
   b. chemically treating said equalized effluent with lime whereby toxic heavy metal impurities are reduced below a toxic level in said effluent and the effluent is neutralized;
   c. adding a polymer flocculating agent and clarifying the thus equalized chemically treated effluent;
   d. subjecting the thus clarified effluent to a second equalizing treatment;
   e. subjecting the resultant mixture to carbon adsorption with activated carbon to remove color and whereby the level of nitrobenzene is reduced below about 12.0 mg/l;
   f. biologically degrading the thus treated effluent with activated sludge containing microorganisms capable of biodegrading organic waste material; and
   g. clarifying said biologically degraded effluent, whereby the color, TOC and BOD are reduced to a predetermined ecologically acceptable level.

2. The method of claim 1 wherein the spent carbon from said carbon adsorption step (e) is recycled to produce fresh carbon for use in said carbon adsorption.

3. The method of claim 2 wherein said recycling of spent carbon includes incinerating the spent carbon.

* * * * *